United States Patent [19]
Kosaraju et al.

[11] Patent Number: 5,861,544
[45] Date of Patent: Jan. 19, 1999

[54] METHOD AND APPARATUS FOR OFFSET IMPACT TESTING OF VEHICLE COMPONENTS AT A SUB-SYSTEM LEVEL

[75] Inventors: Hari K. Kosaraju; Scott A. Esposito, both of Rochester Hills; James Chapp, Jr., West Bloomfield; Joseph Vitous, Clarkston; Samuel Shamir, Bloomfield Hills; Randy J. Spitler, Belleville, all of Mich.

[73] Assignee: Chrysler Corporation, Auburn Hills, Mich.

[21] Appl. No.: 907,723

[22] Filed: Aug. 8, 1997

[51] Int. Cl.$^6$ .................................................. G01M 7/00
[52] U.S. Cl. ........................................ 73/12.09; 73/12.04
[58] Field of Search ............................. 73/12.01, 12.04, 73/12.07, 12.09, 865.3

[56] References Cited

U.S. PATENT DOCUMENTS

| | | |
|---|---|---|
| 3,757,562 | 9/1973 | Goldberg et al. ................. 73/12.04 |
| 3,939,691 | 2/1976 | Stanev et al. ..................... 73/12.01 |
| 4,524,603 | 6/1985 | Hargunani et al. ............... 73/12.01 |
| 5,483,845 | 1/1996 | Stein et al. ........................ 73/12.01 |
| 5,485,758 | 1/1996 | Brown et al. ..................... 73/12.09 |
| 5,614,656 | 3/1997 | Toda et al. ........................ 73/12.01 |

*Primary Examiner*—Max H. Noori
*Attorney, Agent, or Firm*—Thomas G. Pasternak

[57] ABSTRACT

An apparatus for offset impact testing of vehicle components at a sub-system level includes a mobile unit and a vehicle sub-system. In an exemplary application, the vehicle sub-system includes a toe-board and a torque box. A mounting flange is secured to the vehicle sub-system and provides for releasable attachment of the vehicle sub-system to the mobile unit. By advancing the mobile unit into a rigid barrier at a predetermined speed, full-scale toe-board intrusion and torque box crush can be accurately predicted at a significantly reduced cost and time.

7 Claims, 4 Drawing Sheets

METHOD AND APPARATUS FOR OFFSET IMPACT TESTING OF VEHICLE COMPONENTS AT A SUB-SYSTEM LEVEL

BACKGROUND OF THE INVENTION

1. Technical Field

The present invention generally relates to testing of motor vehicles for structural integrity and occupant protection and, more particularly, relates to a method and apparatus for offset impact testing of vehicle components at a sub-system level.

2. Discussion

Prior to production, motor vehicles are subjected to full-scale crash testing to ensure structural integrity and occupant protection. Due to the amount of domestic and foreign impact standards and other requirements a manufacturer may self-impose, full-scale testing involves significant monetary and time commitments. Typically, prototype vehicles are specifically developed for testing and are scrapped after a single impact test. It is desirable to limit the use of full-scale testing to verification of vehicle design for crashworthiness to the extent possible.

It is known to employ computer modeling to simulate impact testing. Such tools have proven to be extremely valuable in initial design of vehicles and vehicle components. However, due to the dynamic interaction between the numerous components of a vehicle, it is impossible to precisely evaluate the crashworthiness of a vehicle through computer modeling. Therefore, it is desirable to conduct impact testing at a sub-system level in order to more accurately predict the crashworthiness of a vehicle prior to full-scale impact testing.

SUMMARY OF THE INVENTION

It is a principal object of the present invention to provide a method and apparatus for testing a vehicle for crashworthiness at a sub-system level.

It is a more particular object of the present invention to provide a method and apparatus for conducting offset impact testing on a sub-system of a vehicle to accurately predict full-scale toe-board intrusion and torque box crush.

It is another object of the present invention to provide a method and apparatus for significantly reducing development time and cost necessary to satisfy full-scale impact test requirements.

In one form, the present invention provides an impact testing arrangement for impact testing a motor vehicle at a sub-system level. The impact testing arrangement includes a mobile unit and vehicle sub-system. A mounting flange is secured to the vehicle sub-system and is removably attached to the mobile unit. The impact testing arrangement may be utilized to predict full-scale testing results.

In another form, the present invention provides a method of impact testing a vehicle sub-system including a toe-board and torque box. The method of the present invention includes the general step of mounting the vehicle sub-system to a cart. The cart is advanced toward a rigid barrier. The vehicle sub-system is impacted into the rigid barrier at a predetermined speed. Finally, the sub-system is analyzed to assess intrusion of the toe-board and crush of the torque box.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
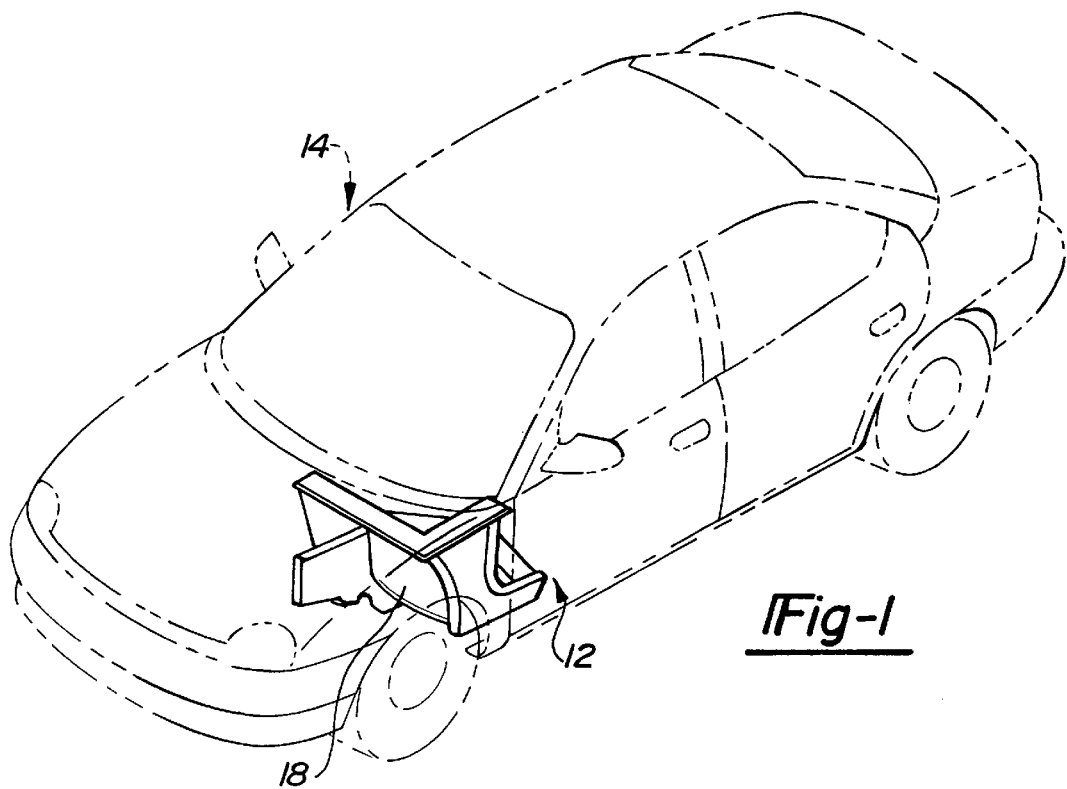
FIG. 1 is a perspective view of a sub-system of a motor vehicle to be tested through application of the method of the present invention shown incorporated into a motor vehicle, the remainder of the vehicle shown in phantom lines.
Figure 2:
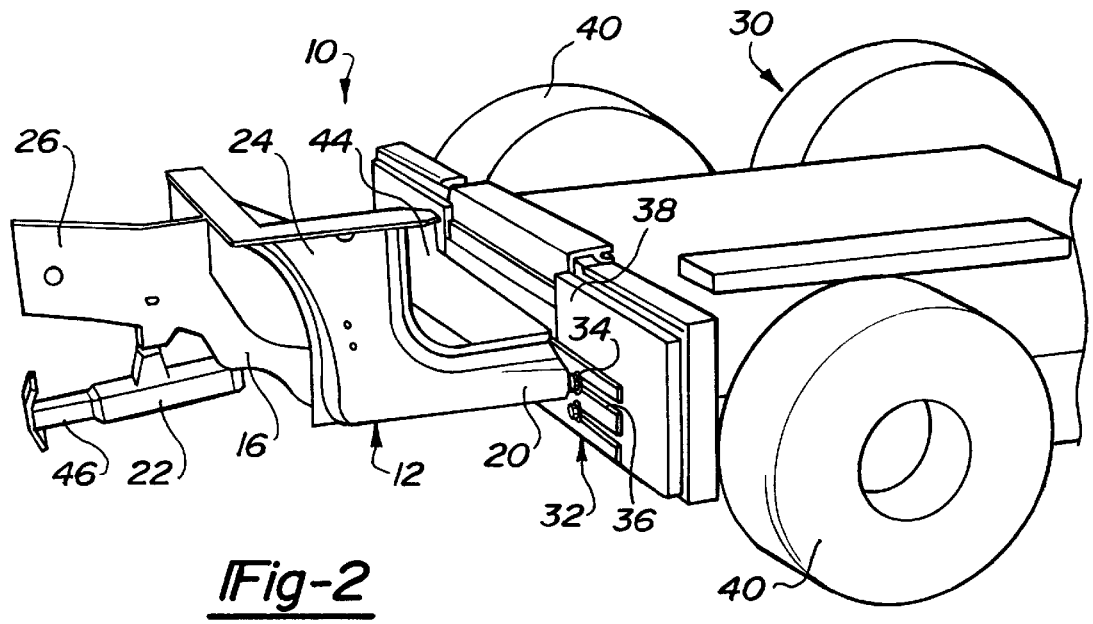
FIG. 2 is a perspective view of a impact testing arrangement constructed in accordance with the teachings of a preferred embodiment of the present invention illustrating the vehicle sub-system mounted to a cart.
Figure 3:
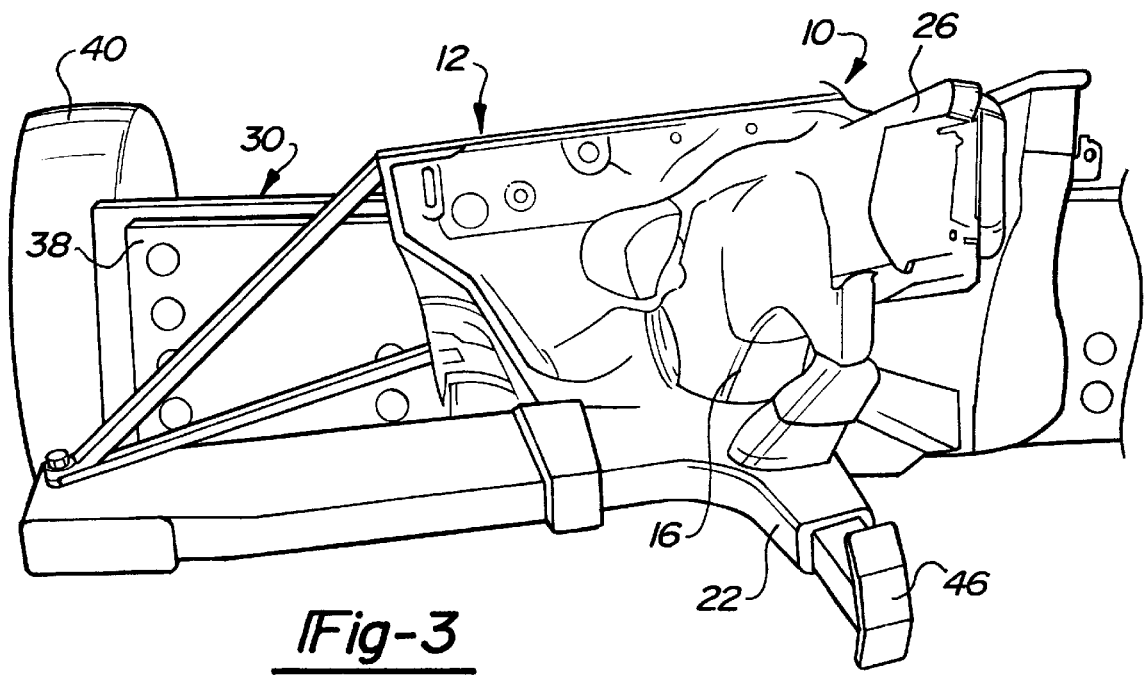
FIG. 3 is a front view of the impact testing arrangement of FIG. 2.
Figure 4:
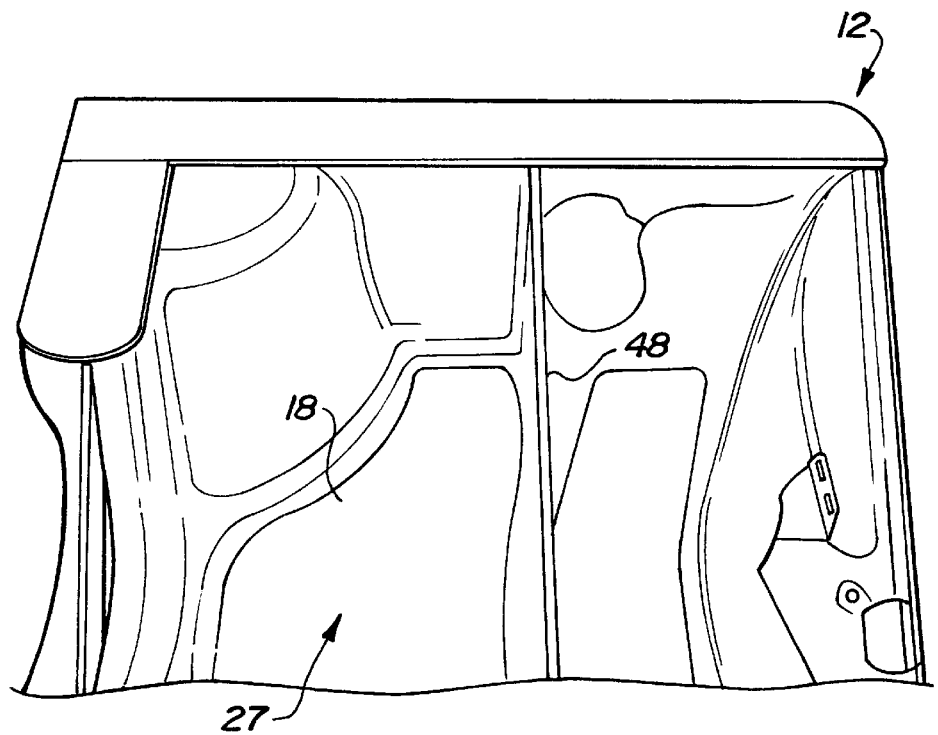
FIG. 4 is a fragmentary top view of the sub-system of FIG. 1.
Figure 5:
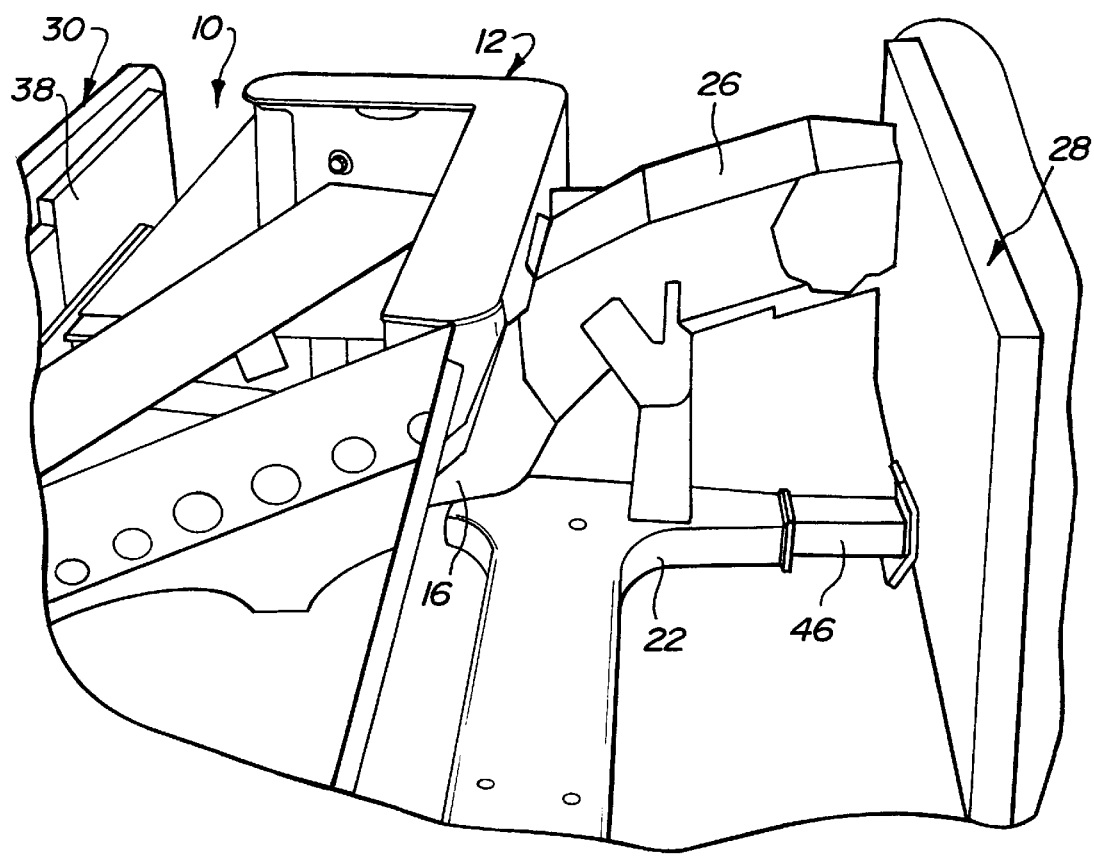
FIG. 5 is a fragmentary right side view of the testing arrangement of FIG. 2 shown operatively associated with a rigid impact barrier immediately prior to impact therebetween.

Turning to FIGS. 1–5 of the drawings, an arrangement for testing the crashworthiness of motor vehicles at a sub-system level is generally identified in the drawings with reference numeral 10. The arrangement 10 is shown through the drawings specifically adapted for impact testing of a specific sub-system or sub-assembly 12. However, as will become apparent below, the teachings of the present invention are more broadly applicable to impact testing for various sub-assemblies or components of a motor vehicle.

Prior to addressing the construction and operation of the arrangement 10 of the present invention, a brief understanding of the exemplary sub-assembly 12 shown in the drawings is warranted. The perspective view of FIG. 1 illustrates the sub-assembly 12 positioned within a motor vehicle 14 (otherwise shown in phantom). The sub-assembly 12 illustrated is extracted from a vehicle shell (not shown) and is shown to generally include a torque box 16, a toe-board 18, a portion of the vehicle sill 20, a suspension cross-member 22, a hinge pillar 24, and a portion of a rail 26. As seen most clearly in the fragmentary view of FIG. 4, the sub-assembly 12 defines a toe-board area 27 within the passenger compartment in which the feet and lower legs of a front seat passenger are located during normal vehicle travel.

Among the various tests which are generally conducted on most motor vehicles is an off-set impact test in which a full-scale vehicle 14 is driven into a rigid barrier 28 (shown in FIG. 5) at a pre-determined speed. The rigid barrier 28 is placed offset to the central axis of the vehicle 14 such that approximately forty percent (40%) of the front end encounters the barrier 28. As a result, the energy from the impact is primarily absorbed by one lateral side of the vehicle 14. Off-set impact testing is conducted to assess torque box crush and toe-board intrusion, among other items. It is this particular test for which the arrangement 10 of the present invention is specifically designed. However, the teachings of the present invention are applicable to other types of crashworthiness testing.

With continued reference to FIGS. 2–5, the arrangement 10 of the preferred embodiment of the present invention will now be further discussed. The sub-assembly 12 is shown most clearly in the perspective view of FIG. 2 removably attached to a cart or sled 30. In this regard, a mounting flange 32 is welded or otherwise suitably attached to a rear end of the sub-assembly 12. Threaded fasteners 34 pass through slots 36 provided in the mounting flange 32 and engage apertures (not shown) provided in a mounting plate 38 carried by the cart 30.

The cart 30 is illustrated to include a plurality of wheels 40. The size and weight of the cart 30 are chosen for the specific crashworthiness testing involved. More specifically, the weight and height of the cart 30, among other factors, are chosen such that impact testing of the sub-assembly 12 is representative of full scale impact testing.

Suitable reinforcements are illustrated associated with the sub-assembly 12. The reinforcements are intended to simulate the environment which would be experienced by the sub-assembly 12 within a full scale vehicle 14. Specifically, a pillar plate hinge 44 is welded or suitably attached to the hinge pillar 44 and sill 20 to prevent hinge pillar crush. An extension 46 is attached to the suspension cross-member to ensure loading of the impact forces directly into the torque box 16. Additionally, a pair of rigid attachments 47 interconnect the cross-member 22 and the torque box 20 to prevent twisting. Further, a plate 48 is disposed within the toe-board area 27 to prevent rotation of the cart 30 and to also prevent dash panel intrusion. Additional and/or alternative reinforcements may be necessary depending on the sub-assembly 12 and impact test involved.

Figure 6:
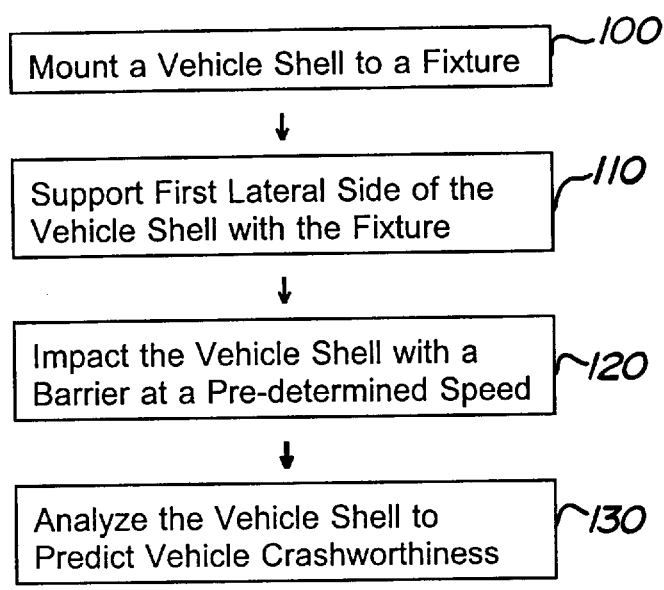
FIG. 6 is a flow diagram illustrating the general steps of the preferred method of the present invention.

With continued reference to FIGS. 1–5 and additional reference to the flow diagram of FIG. 6, the preferred method of the present invention will be described. The first general step 100 of the method of the present involves mounting the vehicle sub-assembly 12 to the cart 30. As noted above, the sub-assembly 12 is bolted or otherwise releasably and securely attached to the cart 30.

The next general step 110 of the method of the present invention involves advancing the cart 30 toward the rigid barrier area 28. As shown the fragmentary view of FIG. 5, the portion of the rail 26 and the extension 46 carried by the cross-member 22 are preferably oriented to ensure the extension 46 encounters the rigid barrier 28, fist, followed by the nail 26. This orientation ensures direct loading of the impact forces to the torque box 16.

The next general step of the preferred method of the present invention involves impacting the sub-assembly 12 into the rigid barrier at a predetermined speed. In one particular application, the cart 30 is impacted with the rigid barrier 28 at a speed of approximately eight miles per hour. However, it will be appreciated by those skilled in the art that the speed of impact may be adjusted depending on factors, including but not limited to, the combined weight of the sub-assembly 12 and cart 30.

The final general step 130 of the present invention involves analyzing the sub-assembly 12 to assess toe-board intrusion and torque box crush. The toe-board intrusion and torque box crush calculated through impact testing of the sub-assembly 12 as described, is indicative of full-scale impact testing. Upon analyzing the testing results, subsequent design iterations of the components included within the sub-assembly 12 may be made to improve the crashworthiness of the sub-assembly 12 (e.g. to reduce both toe-board and intrusion and torque box crush).

While the above description constitutes the preferred embodiment of the invention, it will be appreciated that the invention is susceptible to modification, variation, and change without departing from the proper scope or fair meaning of the accompanying claims.

We claim:

1. An impact testing arrangement for impact testing a motor vehicle at a sub-system level, the impact testing arrangement comprising:
   a mobile unit;
   a vehicle sub-assembly extracted from a vehicle shell including a torque box, a toe-board, a suspension cross-member, a rail an extension attached to said cross member for ensuring direct loading of impact forces to said torque box and
   a mounting flange secured to said vehicle sub-assembly, said mounting flange being removably attached to said mobile unit;
   whereby the impact testing arrangement is used to predict full-scale testing results.

2. The impact testing arrangement for impact testing a motor vehicle at a sub-system level of claim 1, further comprising a plurality of reinforcements attached to said vehicle sub-assembly.

3. An impact testing arrangement for impact testing a motor vehicle to predict full-scale toe-board intrusion and torque box crush at a sub-system level, the arrangement comprising:
   a mobile unit;
   a vehicle sub-assembly extracted from a vehicle shell to including a torque box; a toe-board, a portion of a vehicle sill, a suspension cross-member and a portion of a forwardly extending rail;
   a mounting flange secured to said vehicle sub-assembly, said mounting flange being removably attached to said mobile unit;
   a rigid barrier; and
   an extension member attached to said cross-member adapted to impact said rigid barrier and direct loading of impact forces to said torque box.

4. The impact testing arrangement of claim 3, further comprising a plurality of reinforcements attached to said vehicle sub-assembly.

5. A method of impact testing a vehicle sub-system including a toe-board and torque box, the method comprising the steps of:
   extracting the subassembly from a vehicle shell to include a cross member;
   removably mounting the vehicle subassembly to a mobile unit;
   attaching an extension member to the cross member of the subassembly;
   advancing the mobile unit toward a rigid barrier;
   impacting the vehicle sub-assembly into the rigid barrier at a predetermined speed;
   directing impact forces from said extension member to the torque box; and
   analyzing the sub-assembly to assess intrusion of the toe-board and crush of the torque box.

6. The method of impact testing a vehicle sub-system of claim 5, further including the step of reinforcing said subassembly to simulate full-scale impact testing.

7. The method of impact testing a vehicle sub-system of claim 6, further including the step of modifying the vehicle sub-assembly in response to the step of analyzing the sub-assembly to assess intrusion of the toe-board and crush of the torque box.

* * * * *